(12) United States Patent
Kress et al.

(10) Patent No.: US 6,345,937 B1
(45) Date of Patent: Feb. 12, 2002

(54) TOOL AND METHOD FOR THE CUTTING MACHINING OF A WORKPIECE

(75) Inventors: Dieter Kress, Aalen; Herbert Jäger, Sinsheim-Elsenz, both of (DE)

(73) Assignee: Mapal Fabrik für Präzisionswerkzeuge (DE)

( * ) Notice: Subject to any disclaimer, the term of this patent is extended or adjusted under 35 U.S.C. 154(b) by 0 days.

(21) Appl. No.: 09/470,218

(22) Filed: Dec. 22, 1999

(30) Foreign Application Priority Data

Dec. 22, 1998 (DE) ........................... 198 59 051

(51) Int. Cl.[7] .............................. B23B 41/06
(52) U.S. Cl. .................. 408/1 R; 408/36; 408/83.5; 408/118; 408/147; 408/150
(58) Field of Search .................. 408/36, 83.5, 1 R, 408/150, 151, 153, 147, 173, 180, 118

(56) References Cited

U.S. PATENT DOCUMENTS

| | | |
|---|---|---|
| 2,519,476 A | 8/1950 | Kind |
| 3,755,868 A | 9/1973 | Laforge et al. |
| 4,692,074 A * | 9/1987 | Smith et al. ............... 408/118 |
| 4,708,546 A * | 11/1987 | Noggle ...................... 408/153 |
| 5,044,841 A * | 9/1991 | Biera et al. ................ 408/118 |
| 5,482,412 A * | 1/1996 | Ueda et al. ................ 408/118 |
| 5,865,572 A * | 2/1999 | Kress et al. ................ 408/36 |
| 5,957,632 A * | 9/1999 | Oketani et al. ............ 408/150 |

FOREIGN PATENT DOCUMENTS

| | | |
|---|---|---|
| DE | 2808610 | 10/1978 |
| DE | 3926026 | 2/1991 |
| DE | 19580521 | 9/1996 |

\* cited by examiner

*Primary Examiner*—Steven C. Bishop
(74) *Attorney, Agent, or Firm*—Ostrolenk, Faber, Gerb & Soffen, LLP

(57) ABSTRACT

A tool for cutting machining a workpiece, including a cutter plate supported on a holder for machining a surface and additionally comprising a tool projecting from the body of the tool. The cutter plate is supported on a holder which is in turn supported on a rotatable eccentric such that rotation of the eccentric moves the holder radially. A cooperating converting device converts axial movement of an actuating device into rotation of the eccentric through intermeshing gear elements. A second tool, e.g., a reamer, is moved by a second push/pull rod axially with respect to the body of the tool and into the workpiece, and the second tool is supported on the axis of the main body.

20 Claims, 3 Drawing Sheets

TOOL AND METHOD FOR THE CUTTING MACHINING OF A WORKPIECE

BACKGROUND OF THE INVENTION

The invention relates to a tool for the cutting machining of a workpiece and to control over positioning of the cutting machining elements and to a method for the cutting machining including controlling that positioning.

Known tools of the type referred to herein serve for generating a nonplanar surface on a workpiece, in particular on a valve seat in the region of a cylinder head of an internal combustion engine. The nonplanar surfaces are distinguished in that, as seen in cross section, they comprise at least two segments of a broken line inclined relative to one another or a continuously curved line. In order to machine the surface, either the tool is set in rotation and brought into engagement with the workpiece to be machined or the workpiece is rotated and moved relative to the stationary tool. It is essential to have relative movement between the tool and the workpiece which enables at least one cutter plate of the tool to remove chips from the workpiece.

During machining of the nonplanar surface, the cutter plate is moved in the radial direction relative to an imaginary center axis of the tool or workpiece. Advancing movement of the tool or workpiece along the direction of this center axis occurs simultaneously.

The tool is distinguished in that it comprises a part-tool which is movable relative to the main body of the tool and which, for example, can execute a translational movement relative to the center axis. For example, the part-tool may be designed as a reamer which carries out fine machining on the inner face of a predrilled bearing bush for guiding a valve stem.

In known tools, the cutter plate is received by a holder, which cooperates with a coupling element designed as a slide in order to carry out the axial and radial movement of the cutter plate. An actuating device displaces the slide within the main body of the tool during the machining of the nonplanar surface of the workpiece. To avoid imbalance of the tool which occur as a result, a so-called counterslide is provided, which is intended to compensate the mass displacement within the main body. However, balancing of a tool of this type presents problems. Moreover, such a tool has a highly complicated design and is therefore of high cost.

SUMMARY OF THE INVENTION

In order to achieve this object, a tool is proposed for cutting machining a workpiece, including a cutter plate supported on a holder for machining a surface and additionally comprising a part-tool projecting from the body of the tool. The cutter plate is supported on a holder which is in turn supported on a rotatable eccentric such that rotation of the eccentric moves the holder radially. A cooperating converting device converts axial movement of an actuating device into rotation of the eccentric through intermeshing gear elements. The part-tool, e.g., a reamer, is moved by a second push/pull rod axially with respect to the body of the tool and into the workpiece, and the part-tool is supported on the axis of the main body.

The tool includes a coupling device which comprises an eccentric which is rotatable by the actuating device about an axis offset relative to the center axis of the tool. The holder of the cutter plate of the tool is mounted on the eccentric so that, when the eccentric is rotated, on the one hand, the holder is moved along an imaginary arcuate path and, on the other hand, the holder changes its distance relative to the center axis of the tool executes radial movement. During machining of the nonplanar surface of the workpiece by the cutter plate, an axial movement along the direction of the center axis is undergone at least by the holder, or else by the complete tool relative to the stationary workpiece or by the workpiece relative to the tool. Overall, this moves the cutter plate including movement components in the axial and in the radial direction.

In a preferred embodiment of the tool, the coupling device comprises a converting device which brings about the rotational movement of the eccentric and has at least two intermeshing threaded elements. The threaded elements are designed preferably as coarse-pitch threaded elements. One of the threaded elements is coupled to the actuating device and the other one is coupled to the eccentric. When the actuating device is activated, axial movement of the first threaded element is converted into rotational movement of the other threaded element, which rotates the eccentric and sets a radial position of the cutter plate. This tool is distinguished by a simple design which is not susceptible to faults and which can be implemented costeffectively.

In a preferred embodiment of the tool, one of threaded elements, and particularly the one coupled to the actuating device, comprises a sleeve with a thread on its inside. An embodiment of this kind is possible for use in a very small space, enabling very small tools to be produced.

In a further preferred embodiment of the tool, the actuating device is designed as a first push/pull rod. Actuating devices of this type are known and can therefore be coupled to existing machine tools in a simple way.

In a preferred embodiment of the tool, the part-tool comprises a reamer having a center axis which coincides with the center axis of the tool. This tool makes; it possible, for example, to generate the bearing surface for a valve, that is the valve seat, and to machine the bearing sleeve which guides the stem of a valve.

A method for the cutting and machining of a workpiece for generating a nonplanar surface is known. The nonplanar surface may, in particular, be a valve seat. To that extent, reference is made to the statements regarding the known tool. As stated above, during the machining of the nonplanar surface, the tool can rotate relative to a stationary workpiece, or vice versa. Here, too, it is essential only to have the relative movement between the tool and the workpiece, so that a cutter plate can remove chips from the surface to be machined.

It is known to move the tool up to the workpiece to be machined and to first machine the nonplanar surface, for example, the valve seat in the cylinder head of an internal-combustion engine. Thereafter, the part-tool, in this example a reamer, is moved out of the tool and introduced into the workpiece to be machined. In this case, the surface of the bearing bush for the valve stem is machined.

It has become apparent that during such machining, exact alignment between the valve seat and the valve stem bore cannot be assured. The surface quality and dimensional accuracy of the valve seat surface are often also not the best possible.

An object of the invention, therefore, is to provide a method which is distinguished in that the disadvantages mentioned here are avoided.

In order to achieve this object, a method is proposed which uses the tool of one of the two embodiments. The method is distinguished in that the tool is first moved up to the workpiece while the part-tool is drawn back into the main body of the tool. The part-tool is then introduced into the workpiece to be machined, in order, for example, to machine the bearing bush for the valve stem. This machining step exactly centers the tool relative to the workpiece. It is possible then, for example, to subsequently machine a second workpiece region using the at least one cutter plate of the tool in order to generate the nonplanar surface, with the cutter plate executing movement in the axial and the radial direction.

In a preferred embodiment of the method, at least at the commencement of the machining of the second workpiece region, the part-tool is introduced into the workpiece. The part-tool consequently centers the tool in the workpiece to be machined. When machining of the second workpiece region is begun, the tool or its at least one cutter plate is in an exactly defined position relative to the workpiece. This produces optimum alignment of the two surface regions of the workpiece which are machined with the aid of the tool.

Other features and advantages of the present invention will become apparent from the following description of the invention which refers to the accompanying drawings.

BRIEF DESCRIPTION OF THE DRAWINGS

The invention is explained below with reference to the drawings in which.

DESCRIPTION OF EMBODIMENTS OF THE INVENTION

Figure 1:
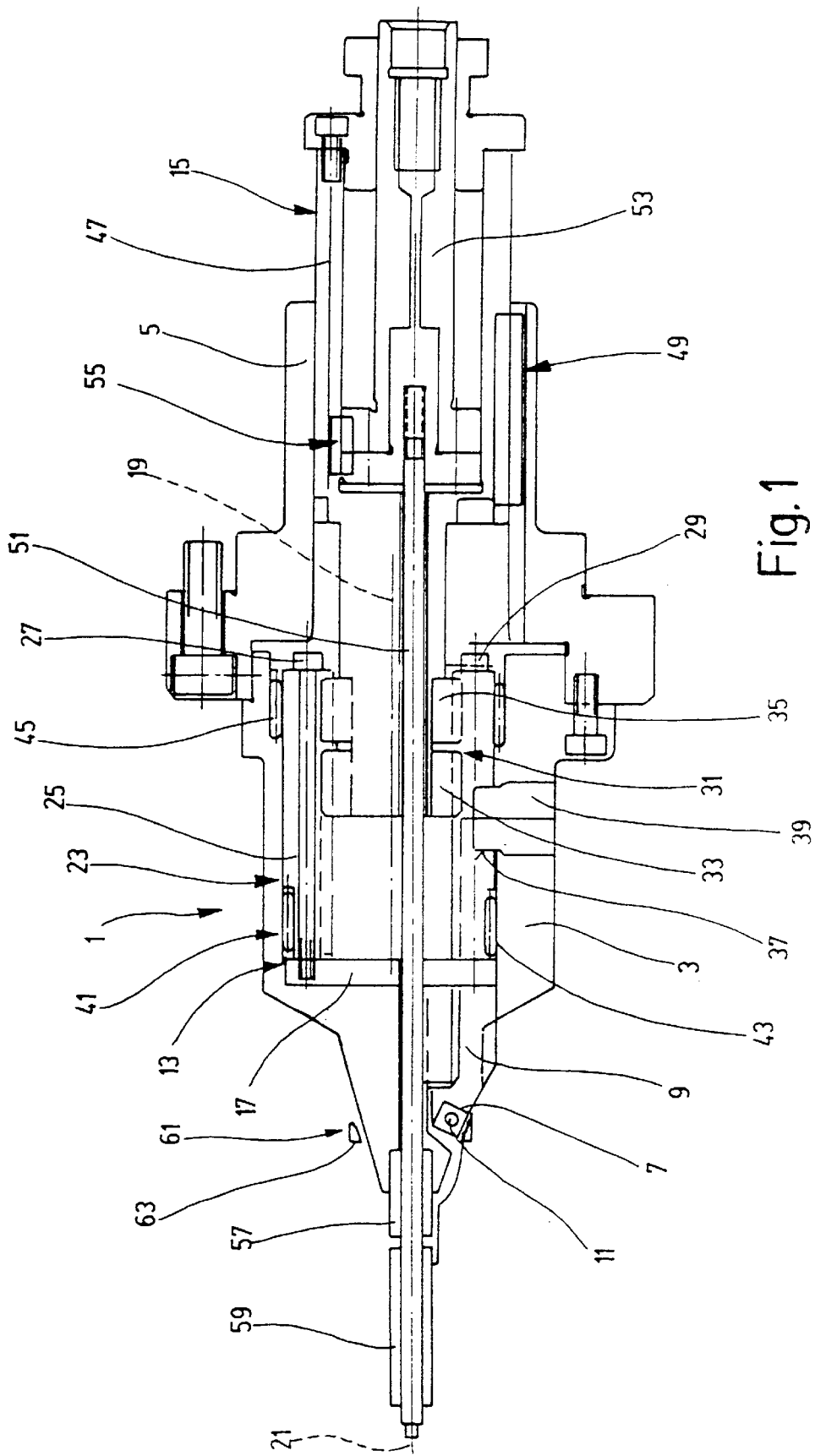
FIG. 1 shows a longitudinal section basic diagram of a first embodiment of a tool of the invention with two push/pull rods.

FIG. 1 shows a tool 1 with a main body 3 which has a fastening shank 5 on one side that is capable of being introduced into a machine tool. The tool 1 has at least one cutter plate 7 which is received by a holder 9 and which is attached to the holder by a fastening screw 11. The holder 9, also designated as a clamping holder, is mounted on a coupling device 13 which cooperates with an actuating device 15.

The coupling device 13 has an eccentric 17 which is coupled to the holder 9. The axis 19 of the eccentric is offset relative to the center axis 21 of the tool 1. The eccentric 17 is coupled, via a converting device 23 of the coupling device 13, to the actuating device 15, in such a way that, when the actuating device 15 is activated, the eccentric 17 rotates about the axis 19. For this purpose, the converting device 23 comprises at least two intermeshing threaded elements which are preferably coarse-pitch threaded elements. In the illustrated embodiment, a first threaded element 25 is attached to the eccentric 17. Screws 27 and 29 fasten the first threaded element 25 to the eccentric 17.

A second threaded element 31, which has two part-elements 33 and 35, cooperates with the first threaded element 25. The first threaded element 25 comprises a hollow sleeve having an internal thread. The second threaded element 31 or its part-elements 33 and 35 is/are inside the element 25 and are provided with a corresponding external thread which meshes with the internal thread of the first threaded element 25.

The first threaded element 25 has a groove 37 in its outer face, into which a retaining element 39 engages to prevent axial displacement of the first threaded element 25 in the direction of the axis 19. The groove 37 extends on the outside of the first threaded element 25 over a circularly arcuate region which runs concentrically to the axis 19.

The first threaded element 25 is rotatably mounted in the main body 3 of the tool 1 by a bearing device 41 which comprises a first bearing 43 in the vicinity of the eccentric 17 and a second bearing 45 at that end of the first threaded element 25 which faces away from the eccentric 17. The bearing device 41 preferably comprises a rolling bearing, wherein the first bearing 43 and the second bearing 45 are placed at as great a distance from one another as possible for holding the converting device 23 securely and as free of play as possible.

The converting device 23 cooperates with a first push/pull rod 47 of the actuating device 15 and that cooperates with a suitable known activating device of a machine tool. The rod 47 is displaceable in the direction of the center axis 21. Rotation of the actuating device 15 or of the push/pull rod 47 relative to the body 3 of the tool 1 during axial displacement is prevented via a first tongue and groove joint 49. The second threaded element 31 or the part-elements 33 and 35 are attached, for example pressed, onto one end of the first push/pull rod 47. During axial movement of the first push/pull rod 47, the second threaded element 31 should likewise move axially within the first threaded element 25 which is designed as a sleeve, as the second threaded element 31 is designed as an insertion part which is capable of insertion into the sleeve of the first threaded element 25. The cooperating internal and external threads of the threaded elements 25 and 31 are designed as coarse-pitch threads. Axial movement of the first push/pull rod 47 causes rotation of the first threaded element 25 and consequently rotates the eccentric 17 about the axis 19.

Axial movement of the second threaded element 31 is critical for operation of the converting device 23. In place of the first push/pull rod 47, the actuating device 15 may have a piston which cooperates with the second threaded element 31 and which can be displaced in the axial direction in any desired manner, for example hydraulically or pneumatically, to rotate the first threaded element 25.

The tool 1 in FIG. 1 has a part-tool 51 which is accommodated in the main body 3, for example a reamer illustrated in its extended position.

The part-tool 51 cooperates with the actuating device 15 which comprises a second, respective, radially inward push/pull rod 53 which is guided inside the first push/pull rod 47 and which is secured against rotation by a second tongue and groove device 55.

The part-tool 51 is coupled rigidly to the actuating device 15 or to the second push/pull rod 53, so that, during movement of the second push/pull rod in the direction along the center axis 21, the part-tool 51 moves axially.

The tool 1 is provided at its left end in FIG. 1 with a guide bush 57, through which the part-tool 51 emerges from the main body 3 of the tool 1.

A bearing bush 59 is arranged in a workpiece to be machined, not illustrated, for example in a cylinder head of an internal-combustion engine. A second workpiece region 61, specifically a ring 63, is machined by the cutter plate 7 to generate a nonplanar surface, specifically a valve seat, by means of the tool 1 while the part-tool remains in the finished bearing bush 59.

Figure 2:
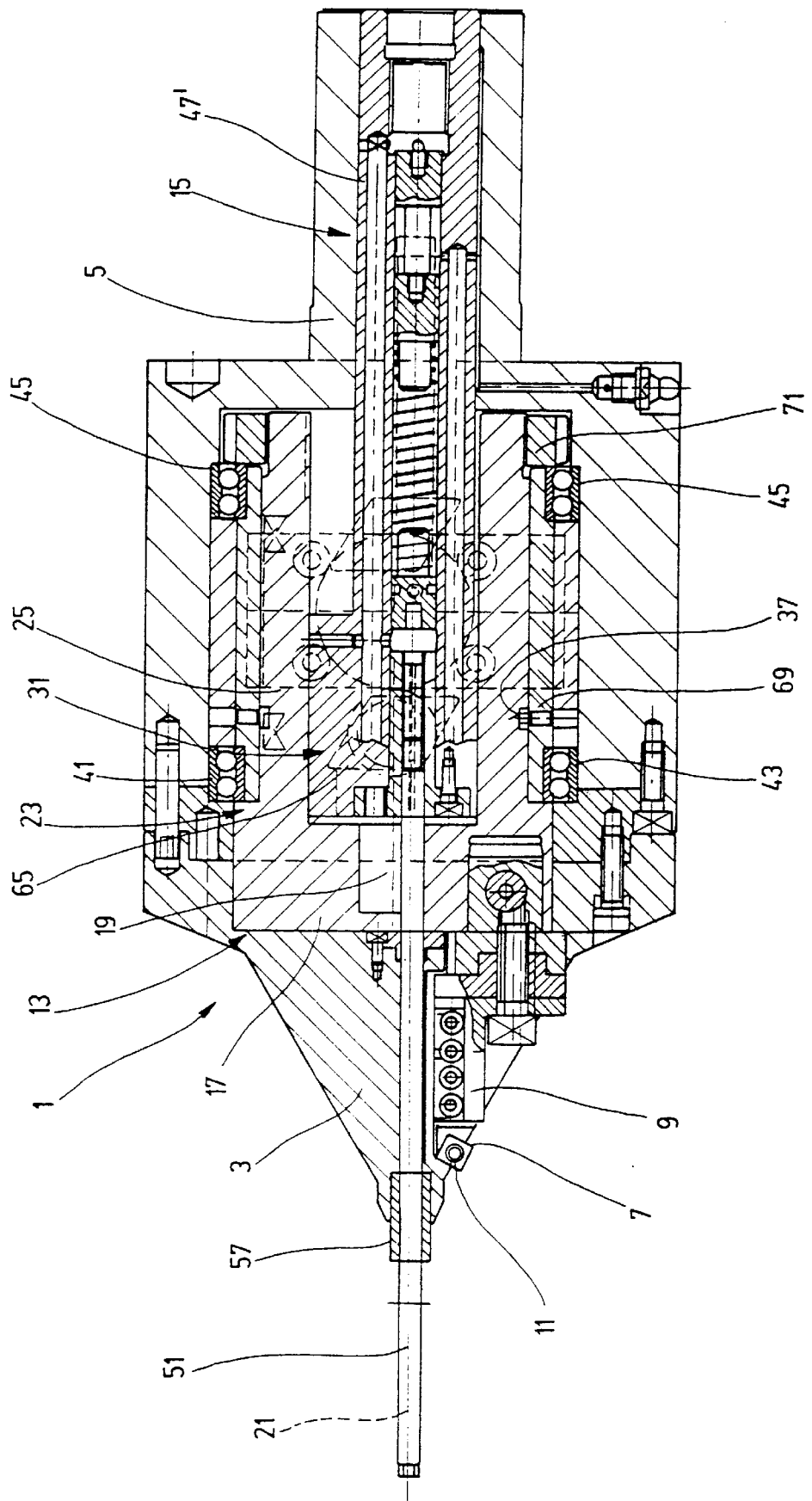
FIG. 2 shows a longitudinal section basic diagram of a further embodiment of a tool of the invention with a single push/pull rod.

FIG. 2 is a longitudinal section of a second embodiment of the tool 1, in which identical parts are given the same reference numerals, and therefore, to that extent, reference is made to the description relating to FIG. 1.

The tool 1 in FIG. 2 has a coupling device 13 which has an eccentric 17 and a converting device 23, including a first threaded element 25, which is in the form of a sleeve and is in one piece with the eccentric 17. The first threaded element 25 has an inner groove, also designated as a twisted groove, on its inside, which lies on an imaginary helix. A block 65 engages in the helix, as indicated by broken lines. It is coupled rigidly to the actuating device 15, which here comprises only a single push/pull rod 47'. The rod is displaceable inside the main body 3 of the tool 1 in the direction of the center axis 21, and the block 65 is likewise positively displaced in the axial direction. The block serves as a second threaded element 31 which cooperates with the first threaded element 25 such that axial movement of the block 65 or of the push/pull rod 47' causes rotation of the eccentric 17. Here, too, the cutter plate 7 attached to the eccentric 17 via a holder 9 is moved along an arcuate curved path, with the distance of the holder relative to the center axis 21 changing.

A bearing device 41 has a first bearing 43 facing the eccentric and a second bearing 45 arranged at that end of the converting device 23 away from the eccentric 17.

In the embodiment illustrated in FIG. 2, too, the part-tool 51, which is illustrated here in its extended position, passes through the main body 3 of the tool 1. It is, in turn, guided by a guide bush 57 and coupled to the actuating device 15 or the push/pull rod 47'.

In the embodiment in FIG. 2, too, a tongue and groove device, not illustrated here, is provided, which prevents the actuating device 15 or the push/pull rod 47' from being rotated relative to the basic body 3 of the tool 1.

The converting devices in FIGS. 1 and 2 included a first threaded element 25 having an internal thread and a second threaded element having an external thread. In FIG. 2, the internal thread comprises the inner groove on the inner face of the first threaded element 25 and the external thread of the second threaded element 31 comprises at least one block 65 which engages in the inner groove.

In both embodiments, it is possible to achieve the function of the converting device with a first threaded element designed as a sleeve which is moved in the axial direction by an actuating device 15, wherein the first threaded element cooperates via an internal thread with an external thread of a second threaded element which sets an eccentric in rotation, while the sleeve shaped first threaded element is displaced axially.

The embodiment of the tool 1 in FIG. 2 likewise suitably ensures that displacement of the converting device 23 or of the first threaded element 25 is prevented during axial movement of the actuating device 15. For example, a retaining pin 69 is anchored in the bearing device 41 and engages into a groove 37 in the outer face of the first threaded element 25. The bearing device 41 is secured against axial displacement by a retaining ring 71 which, for example, is screwed onto the first threaded element 25. This ensures that axial movement of the actuating device 15 or of the push/pull rod 47' is converted solely into rotational movement of the first threaded element 25 or of the eccentric 17.

The operation of the tool in either FIGS. 1 and 2 is discussed below and execution of the method for the cutting machining of a workpiece is discussed with reference to FIG. 3

Figure 3:
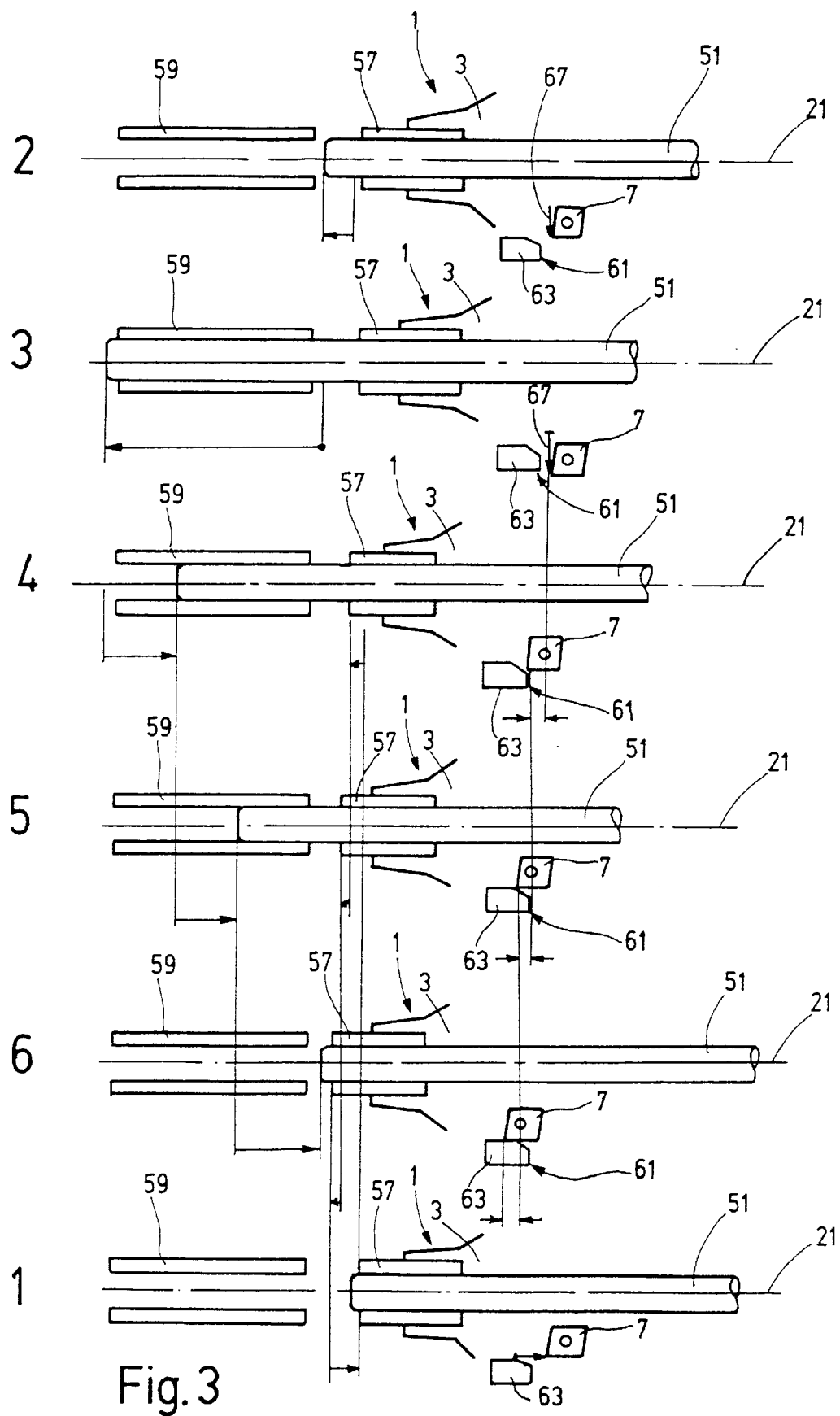
FIG. 3 shows a basic diagram to illustrate a method for cutting machining of a workpiece.

FIG. 3 shows various functional positions, illustrated by the numerals 1 to 6, of the tool 1, which is merely suggested here, and of the associated part-tool 51. FIG. 3 also shows the guide bush 57. Only the bearing bush 59 and the ring 63 of the workpiece to be machined are indicated. The ring 63 constitutes the second workpiece region 61, in which the nonplanar surface is to be generated by means of the cutter plate 7.

The bottom of FIG. 3 shows the initial position 1 of the tool 1 opposite a workpiece to be machined. Here, the part-tool 51, that is the reamer, is drawn back almost completely into the main body 3 or the guide bush 57. It is essential that, in this functional position or during this method step, neither the part-tool 51 nor the cutter plate 7 be in engagement with the workpiece to be machined. The part-tool 51 is drawn back so far that the bearing bush 59 is not machined, and, moreover, the cutter plate 7 is not in engagement with the ring 63.

The top of FIG. 3, indicates a first method step 2. Here, the part-tool 51 is displaced axially in the direction of a first workpiece region, specifically the bearing bush 59, in order to subject the inner face of the bush to cutting machining. An arrow 67 indicates, that the cutter plate 7 is moved radially outward relative to the center axis 21 of the tool 1 by rotation of the eccentric 17.

The part-tool 51 is further advanced, that is, it is moved out of the main body 3 of the tool 1, until it has machined the bearing bush 59 over the entire length of the bush. This is indicated in FIG. 3 in the fictional position 3. The cutter plate 7 is moved further radially outward by the eccentric.

The radially outward movement of the cutter plate 7 is brought about, in method steps 2 and 3, by rotation of the eccentric 17.

During the third method step 4 in FIG. 3, the part-tool 51 is drawn into the main body 3 of the tool 1 and out of the bearing bush 59.

The cutter plate 7 machines the second workpiece region 61, specifically the ring 63, in order to generate a non planar surface, here the valve seat. For this purpose, the cutter plate is subjected simultaneously to radially inward movement in the direction of the center axis 21 and to axial movement indicated by an arrow 67 in FIG. 3 at step 4. The non planar surface is generated on the ring 63 as a result of the superposed radial and axial movements of the cutter plate 7. During this step the part-tool 51 is displaced toward the tool 1 within the finished bearing bush 59, as shown in step 4 and 5 of FIG. 3.

A fourth method step 5 merely illustrates that the part-tool 51 is moved further out of the bearing bush 59 as it is drawn into the main body 3 of the tool 1.

In order to generate the nonplanar surface on the ring 63, the tool 1 is moved to the left further in the axial direction, in the direction of the center axis 21, while the cutter plate 7 is subjected to radially inward movement in the direction of the center axis 21.

In step 6 in FIG. 3, the part-tool 51 is drawn completely back further into the main body 3 of the tool 1 until it has finally been moved completely out of the bearing bush 59. As a result of advancing movement of the tool 1, the cutter plate 7 executes a further axial movement and is simultaneously displaced radially in the direction of the center axis 21 by the eccentric.

In a last method step, again identified by numeral 1, the tool 1 is displaced to the right, causing axial movement of the cutter plate 7. The cutter plate is then located in its radially innermost position, at the shortest distance from the center axis 21. The tool 1 has therefore assumed an initial position which corresponds to the basic position explained above. Machining of the workpiece has concluded.

In performing the method of FIG. 3, with a tool 1 of FIG. 1, the cutter plate 7 and the part-tool 51 may be displaced separately from one another. The actuating device 15 of the embodiment of FIG. 1 has two push/pull rods 47 and 53, which are activatable independently, the first push/pull rod 47 for the converting device 23 or the radial displacement of the cutter plate 7 and the second push/pull rod 53 for the displacement of the part-tool 51.

In the tool embodiment of FIG. 2, the actuating device 15 has only a single push/pull rod 47'. When the rod is displaced axially in the direction of the center axis 21, the part-tool 51 is consequently also moved positively in and out in the axial direction. At the same time, by means of the converting device 23 explained with reference to FIG. 2, the eccentric 17 of the second embodiment is rotated, because the block 65 cooperates with the inner groove of the first threaded element 25. Therefore, there is a mechanical coupling between the axial movement of the part-tool 51 and the rotational movement of the eccentric 17. The radial movement of the cutter plate 7 is consequently also coupled rigidly to the axial movement of the part-tool 51.

In both embodiments, axial movement of the cutter plate 7 is brought about by axial movement of the entire tool 1. It is also possible, however, for only the holder 9 to execute an axial movement relative to the basic body 3, if a special actuating device for this movement is provided.

It is apparent from the explanations that the part-tool 51 which passes through the converting device 23 and the eccentric 17 must be guided to enable the desired rotational movement of the eccentric. The latter is provided, for example, with an arcuate recess, by which the part-tool 51 is guided.

The machining of the two workpiece regions may also take place in reverse order. It is therefore possible first to machine the valve seat and at the same time displace the at least one cutter plate by means of an eccentric and only thereafter to machine the bearing bush 59 which guides the valve stem. Since the two workpiece regions are machined in a single operation and there is no need for a tool to be guided up again in a second separate machining pass, optimum alignment of the tool in relation to the workpiece regions to be machined is ensured, so that the valve seat is arranged concentrically relative to the bearing bush.

It is particularly advantageous, however, in the method described above, for the machining of the valve seat to be initiated while the part-tool 51 is still being guided in the bearing bush. In this case, therefore, there is virtually a mechanical coupling of the cutter plate to the part-tool, so that, here, the concentric arrangement of the valve seat and the bearing bush is ensured to a particular degree.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A tool for cutting machining of a workpiece for generating a surface, the tool comprising:
   a main body having an axis of rotation;
   a cutter plate holder on the main body which is rotatable with the main body;
   a cutter plate supported on the holder and exposed radially outwardly for cutting a surface as the main body is rotated;
   an actuating device for the holder and the cutter plate; a coupling device between the actuating device and the holder, the coupling device comprising an eccentric supporting the holder and which is eccentric to the axis of the main body, the eccentric being rotatable with respect to the main body for setting a radial position for the cutter plate;
   a part tool supported in the main body on the axis of rotation;
   the actuating device being operable for displacing the part tool axially relative to the main body and for operating the part tool and the cutter plate of the tool.

2. The tool of claim 1, wherein the actuating device is movable in the direction of the axis of rotation, and the tool further comprises a converting device for converting axial movement of the actuating device into eccentric rotation of the eccentric with respect to the main body.

3. The tool of claim 1, wherein the converting device comprises a first intermeshing threaded element on the actuating device and a second intermeshing threaded element on the eccentric and intermeshed with the first threaded element such that movement of the actuating device causes rotation of the eccentric through the intermeshing threaded elements.

4. The tool of claim 1, wherein the first threaded element has one of an external and an internal thread and the second of these threaded elements has the other of an internal and external thread for intermeshing the threaded elements.

5. The tool of claim 3, wherein the first threaded element is on the actuating device and is internal on the actuating device and the second threaded element comprises the eccentric having an external thread which cooperates with the internal thread of the actuating device.

6. The tool of claim 5, wherein the actuating device includes a sleeve having the internal thread thereon for engaging the external thread on the eccentric.

7. The tool of claim 6, wherein the eccentric having the external thread is insertable into the sleeve of the actuating device.

8. The tool of claim 7, further comprising a push/pull rod for the actuating device by which the actuating device is moved axially relative to the eccentric.

9. The tool of claim 1, wherein the part tool has a center axis of rotation which corresponds with the rotation axis of the tool.

10. The tool of claim 9, wherein the part tool comprises a reamer.

11. The tool of claim 9, wherein the part tool is displaceable in the direction of the axis of rotation.

12. The tool of claim 11, wherein the actuating device comprises a first actuator for the holder and the cutter plate and an independently operable second actuator for actuating and moving the part tool.

13. The tool of claim 2, wherein the part tool extends through the coupling device and the actuating device.

14. The tool of claim 11, further comprising a push/pull rod for the actuating device by which the actuating device is moved axially relative to the eccentric;
   the actuating device having a second push/pull rod for the part tool.

15. The tool of claim 14, wherein the second push/pull rod is concentric with the first push/pull rod.

16. A method for cutting machining a workpiece for generating a surface using a tool having a main body with at least one cutter plate held by a holder on the main body, a part tool displaceable axially relative to the main body and an actuating device which includes an eccentric coupled with the holder for the cutting plate, the method comprising the steps of:

guiding the tool up to the workpiece and having the part tool in an operative position;

moving the part tool in one direction out of the tool and into the workpiece to be machined for machining a first workpiece region, thereby completing the first workpiece region;

axially moving the cutter plate in the one direction as the part tool is displaced in a direction axially opposite to the one direction within the first workpiece region; and radially displacing the cutter plate, thereby machining a second workpiece region to generate the surface.

17. The method of claim 16, wherein the machining of the second workpiece region by the cutter plate follows after the moving of the part tool into the workpiece to machine the first workpiece region.

18. The method of claim 17, wherein at least at commencement of machining of the second workpiece region, moving the part tool into the workpiece.

19. A method for cutting machining a workpiece for generating a surface using a tool having a main body with at least one cutter plate held by a holder on the main body, a part tool displaceable axially relative to the main body and an actuating device which includes an eccentric coupled with the holder for the cutting plate, the method comprising the steps of:

guiding the tool up to the workpiece and having the part tool in an operative positive;

moving the part tool out of the tool and into the workpiece to be machined for machining a first workpiece region;

axially moving the holder of the cutter plate or moving the entire tool, thereby axially displacing the cutter plate; and rotating the eccentric to radially displace the cutter plate while axially moving the cutter plate, thereby machining a second workpiece region to generate the surface.

20. A method for machining a workpiece with a tool extending along an axis and having a part tool, and at least one cutter plate, the method comprising the steps of:

(a) guiding said part tool in one direction along said axis into said workpiece to be machined, thereby completing machining of a first workpiece region;

(b) thereafter displacing said part tool in a second direction axially opposite to said one direction within the machined first workpiece region; and (c) displacing said cutter plate radially toward said part tool and axially in said one direction, thereby machining a second workpiece region to generate a surface while having said part tool within said first workpiece region.

* * * * *